United States Patent
Senk et al.

(10) Patent No.: US 10,071,277 B2
(45) Date of Patent: Sep. 11, 2018

(54) MOTORCYCLE RIDING EXERCISE TRAINING DEVICE

(71) Applicant: Ryno Power Equipment Inc., Owosso, MI (US)

(72) Inventors: Eric Walter Senk, Winchester, CA (US); Ryan William Hughes, Temecula, CA (US)

(73) Assignee: Ryno Power Equipment Inc., Owosso, MI (US)

( * ) Notice: Subject to any disclaimer, the term of this patent is extended or adjusted under 35 U.S.C. 154(b) by 118 days.

(21) Appl. No.: 15/343,871

(22) Filed: Nov. 4, 2016

(65) Prior Publication Data

US 2017/0128773 A1    May 11, 2017

Related U.S. Application Data

(60) Provisional application No. 62/251,343, filed on Nov. 5, 2015.

(51) Int. Cl.
| | |
|---|---|
| *G09B 9/04* | (2006.01) |
| *A63B 22/18* | (2006.01) |
| *B62H 3/10* | (2006.01) |
| *B62H 7/00* | (2006.01) |
| *G09B 9/058* | (2006.01) |
| *A63B 26/00* | (2006.01) |

(52) U.S. Cl.
CPC ............... *A63B 22/18* (2013.01); *B62H 3/10* (2013.01); *B62H 7/00* (2013.01); *G09B 9/058* (2013.01); *A63B 26/003* (2013.01)

(58) Field of Classification Search
USPC ........ 434/55, 61, 62, 247; 472/95, 103–105; 482/57
See application file for complete search history.

(56) References Cited

U.S. PATENT DOCUMENTS

| | | | |
|---|---|---|---|
| 819,878 A | * 5/1906 | Grindy | ..................... A47C 1/11 248/594 |
| 2,996,298 A | 8/1961 | Grosse et al. | |
| 3,686,776 A | * 8/1972 | Dahl | ................. G01M 17/0076 434/61 |
| 4,093,198 A | * 6/1978 | Petersen | ................ A63G 13/08 267/179 |
| 4,728,087 A | * 3/1988 | Wils | ........................ F16F 1/122 248/624 |
| 5,522,772 A | * 6/1996 | Chenard | ................ A63G 13/08 472/103 |

(Continued)

FOREIGN PATENT DOCUMENTS

| | | |
|---|---|---|
| DE | 102006013328 | 10/2006 |
| JP | 2012145847 | 8/2012 |

*Primary Examiner* — Kurt Fernstrom
(74) *Attorney, Agent, or Firm* — Warner Norcross + Judd LLP

(57) ABSTRACT

An exercise training device for use with a motorcycle for working out to improve a rider's physical fitness is provided. The training device includes a base, a mounting plate, and a plurality of support legs extending from the base. A coil spring is vertically mounted between the base and the mounting plate. A motorcycle can be releasably affixed to the mounting plate with a plurality of hold downs. The coil spring deflects in response to lateral forces such that the affixed motorcycle can pitch and roll when subject to sufficient force.

19 Claims, 8 Drawing Sheets

(56) References Cited

U.S. PATENT DOCUMENTS

| | | | | |
|---|---|---|---|---|
| 5,533,899 A | * | 7/1996 | Young | G09B 9/058 |
| | | | | 434/61 |
| 7,438,672 B1 | * | 10/2008 | Rylander | A63B 22/0605 |
| | | | | 446/396 |
| 7,476,188 B2 | * | 1/2009 | Perez, Jr. | A63B 23/0211 |
| | | | | 472/103 |
| 2002/0077221 A1 | * | 6/2002 | Dalebout | A63B 26/003 |
| | | | | 482/57 |
| 2009/0318274 A1 | | 12/2009 | Welsh | |
| 2014/0315157 A1 | * | 10/2014 | Bober | G09B 9/058 |
| | | | | 434/61 |

\* cited by examiner

MOTORCYCLE RIDING EXERCISE TRAINING DEVICE

CROSS-REFERENCE TO RELATED APPLICATION

This application claims the benefit of U.S. Provisional Patent Application No. 62/251,343, filed Nov. 5, 2015, which is incorporated herein by reference in its entirety.

TECHNICAL INVENTION

The present invention relates to an exercise device. More particularly, the invention relates to an exercise training device for use with a motorcycle to train for motocross riding.

BACKGROUND

Motocross, on either motorcycles or bicycles, is a popular form of off-road racing held on various racecourses. Motocross is a physically demanding sport that requires proper physical conditioning. At competitive levels, the sport requires excellent physical fitness and is a rigorous cardiovascular workout. There are different types of motocross events, some of which require the rider to corner the motorcycle at an inclined position. One area of conditioning that is therefore needed is that of the rider's abdomen or core.

A variety of exercises have been known for a long time to strengthen the core. However, performing strengthening and balance exercises while seated on a motorcycle proves to be more effective and targeted for training riders.

SUMMARY

The present invention provides an exercise training device for use with a motorcycle for working out to improve a rider's physical fitness. The training device includes a base with a central surface and a mounting plate with upper and lower surfaces. A coil spring is vertically mounted between the base and the mounting plate, and an upper end of the coil spring is attached to the lower surface of the mounting plate, while a lower end of the coil spring is attached to the central surface of the base. A motorcycle can be releasably affixed to the mounting plate with a plurality of hold downs. The coil spring deflects in response to lateral forces such that the affixed motorcycle can pitch and roll when subject to sufficient force.

The training device is configured such that a rider seated on the motorcycle can controllably maneuver the motorcycle between an initial vertical position and an inclined position where the motorcycle is inclined to the left or right of the vertical position. The rider maneuvers the position of the motorcycle by leaning to one side or the other.

The training device also includes a pair of limit straps attached to the base and the mounting plate. A left limit strap restricts the degree of incline to which the motorcycle can be maneuvered to the right, and a right limit strap restricts the degree of incline to which the motorcycle can be maneuvered to the left.

Further, the mounting plate includes a plurality of slots therethrough; the hold downs extend through the slots and the position of the hold down within the slot may be adjusted to accommodate the varying structures of different motorcycles.

DETAILED DESCRIPTION

Figure 1:
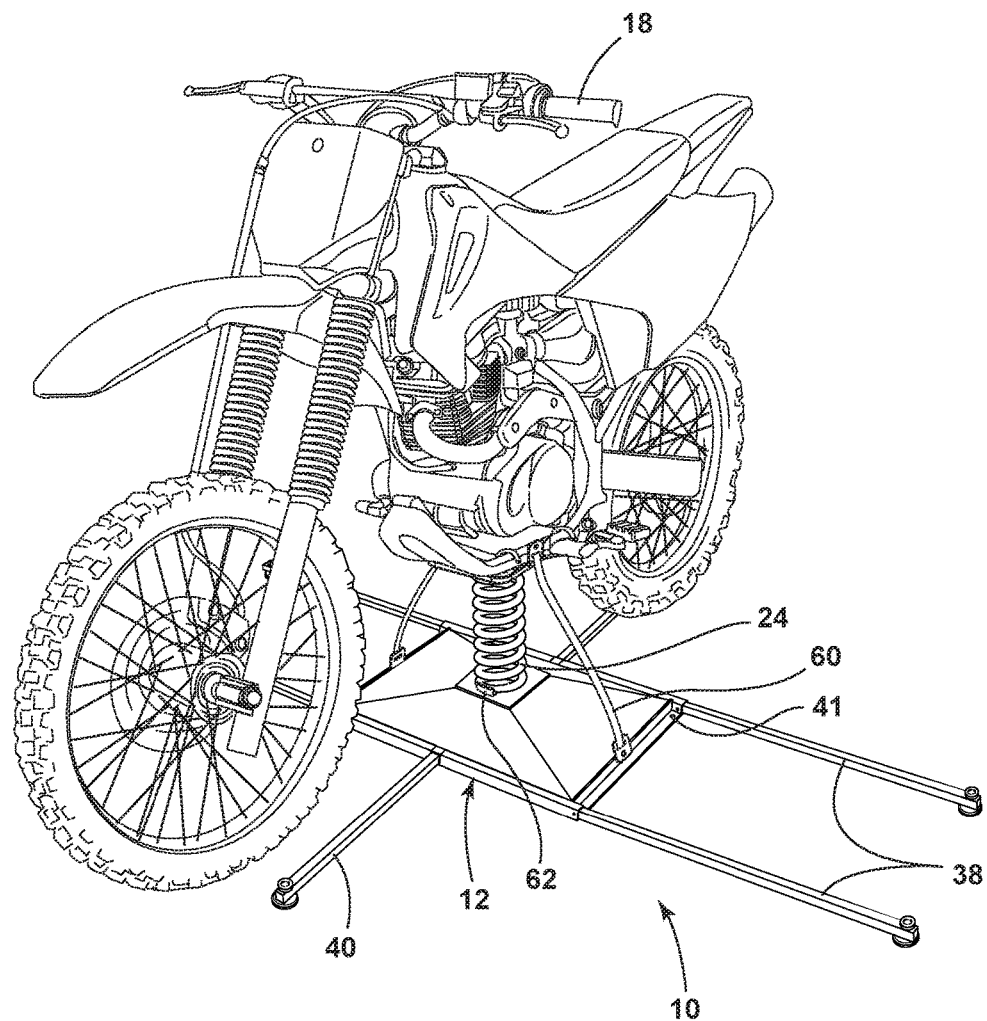
FIG. 1 is a perspective view of an exercise training device including a motorcycle mounted thereto according to one embodiment of the present invention.
Figure 2:
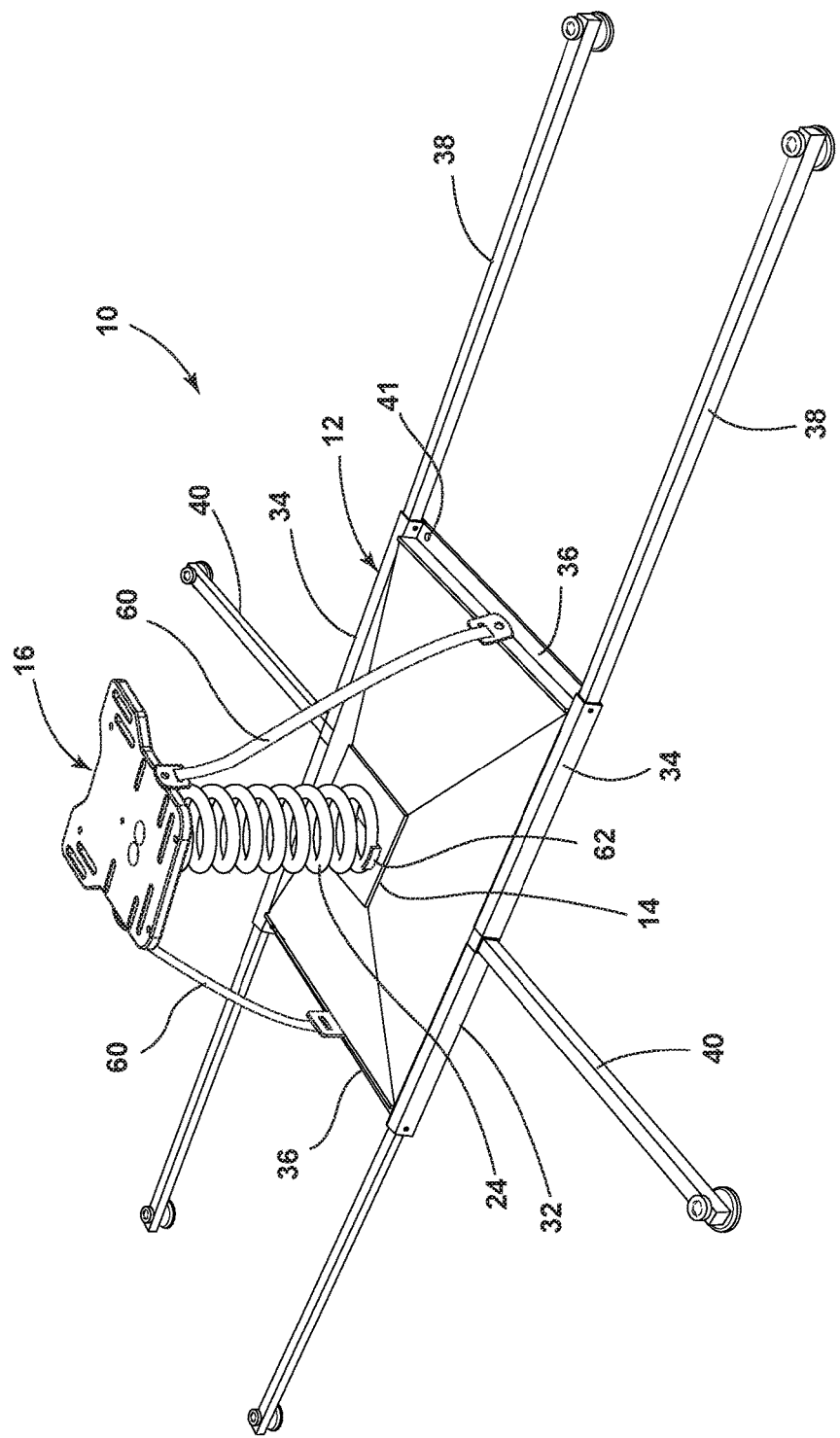
FIG. 2 is a perspective view of the exercise training device.
Figure 3:
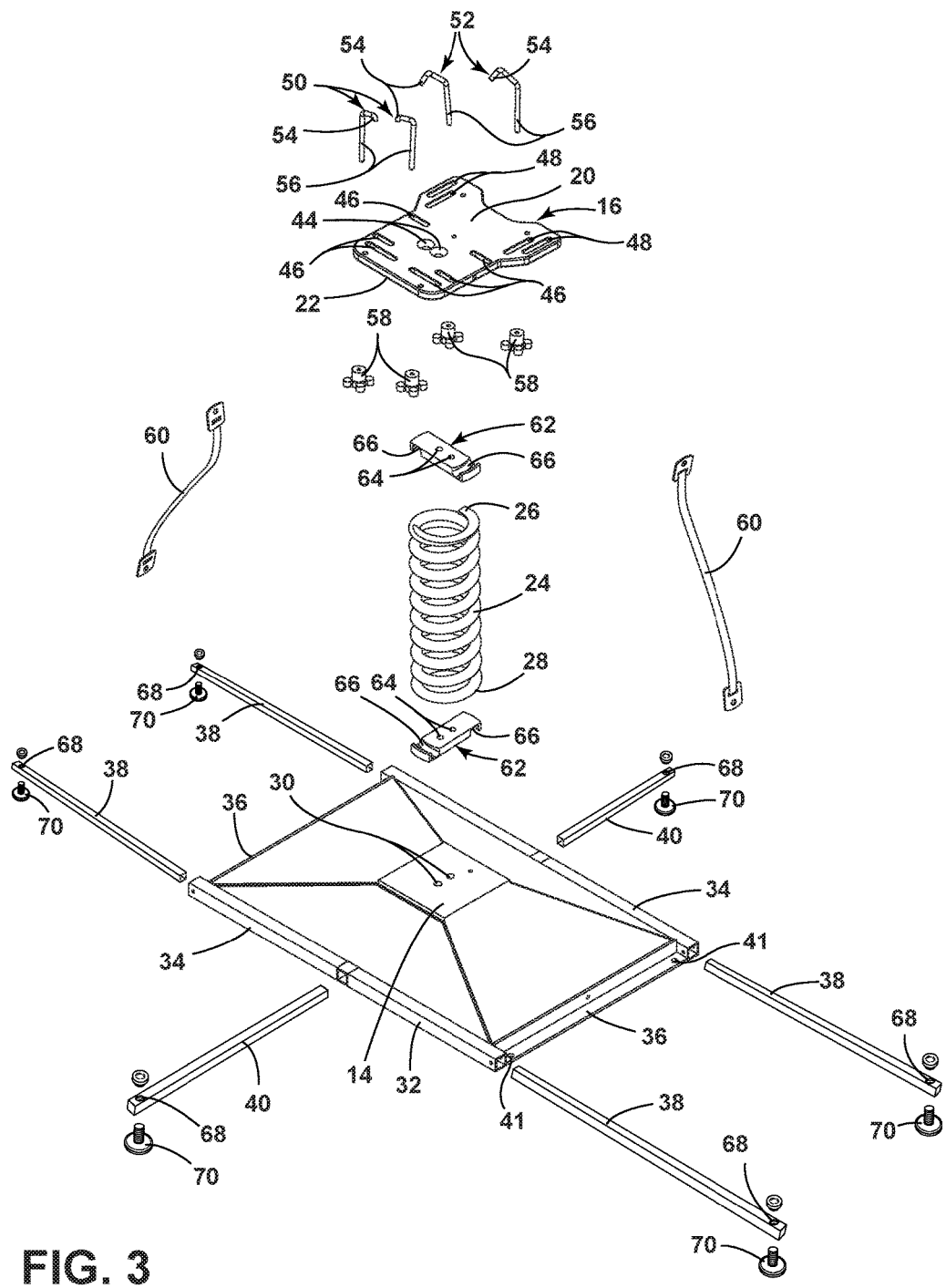
FIG. 3 is an exploded view of the exercise training device.
Figure 4:
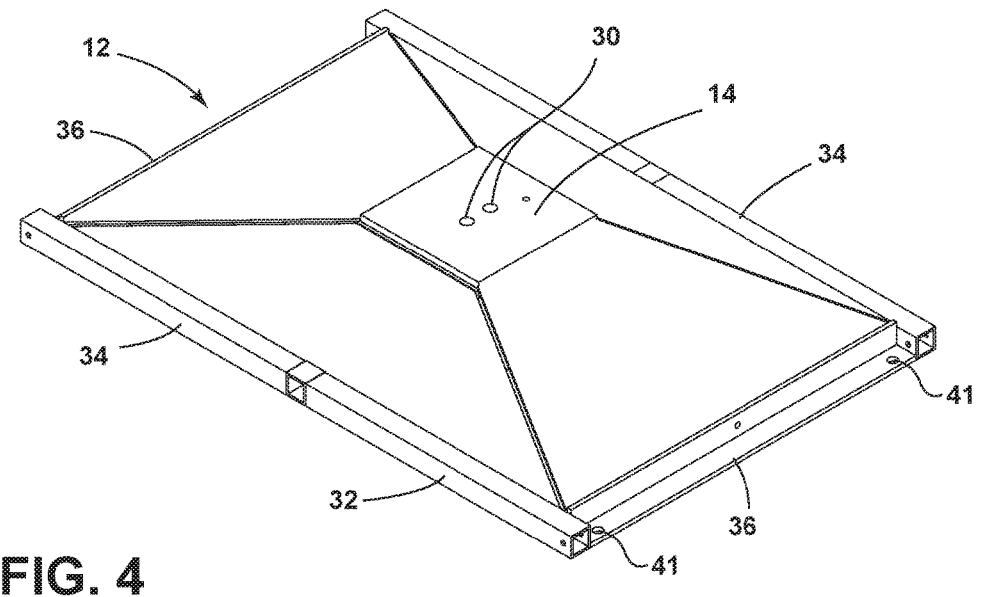
FIG. 4 is an upper perspective view of a base of the exercise training device.

Referring to FIGS. 1-3, an exercise training device of the present invention is generally shown at 10. The training device 10 includes a base 12 having a central surface 14 and a mounting plate 16 to which a motorcycle 18, motorcycle frame, or other type of cycle, may be mounted. The motorcycle or frame may be an actual motorcycle or frame, a model or structure representative of a motorcycle or frame, and may be only a portion of the motorcycle or frame rather than the entire motorcycle or frame. The mounting plate 16 includes an upper surface 20 and a lower surface 22. A biasing element 24 is vertically mounted between the base 12 and the mounting plate 16. As illustrated in FIGS. 1-3, the biasing element may be in the form of a compression or coil spring. The mounting plate 16 is spaced from the base 12 by the coil spring 24. More specifically, an upper end 26 of the coil spring 24 is affixed to the lower surface 22 of the mounting plate 16, and a lower end 28 of the coil spring 24 is affixed to the central surface 14 of the base 12.

The base 12 is a rigid, generally rectangular structural member. Referring to the example illustrated in FIGS. 2-5, the raised central surface 14 of the base 12 includes two base mounting holes 30. The base 12 includes a frame 32 and multiple support legs extending from the base 12 to prevent the training device 10 from tipping over during use. In relation to the mounted motorcycle 18, the rectangular base 12 defines transverse sides 34 and longitudinal sides 36. Two pairs of transverse support legs 38 extend from each of the transverse sides 34 of the base 12, providing stability in the side-to-side direction relative to the motorcycle 18. A pair of longitudinal support legs 40 extends from the longitudinal sides 36 of the base 12, providing stability in the fore-aft direction relative to the motorcycle 18. The transverse and longitudinal support legs 38, 40 may be integrally formed with the frame 32 or may be affixed to the frame 32 in any suitable manner; for example a male/female-type connection. It should be understood that additional sets of transverse and/or longitudinal support legs may be included on the base 12 to provide additional support for the training device 10. In addition, the frame 32 may include throughholes 41 for mounting the base 12 to the support surface, as described in more detail below. Therefore, the support legs 38, 40 should be considered as an option and not required of the device of the present invention.

Figure 5:
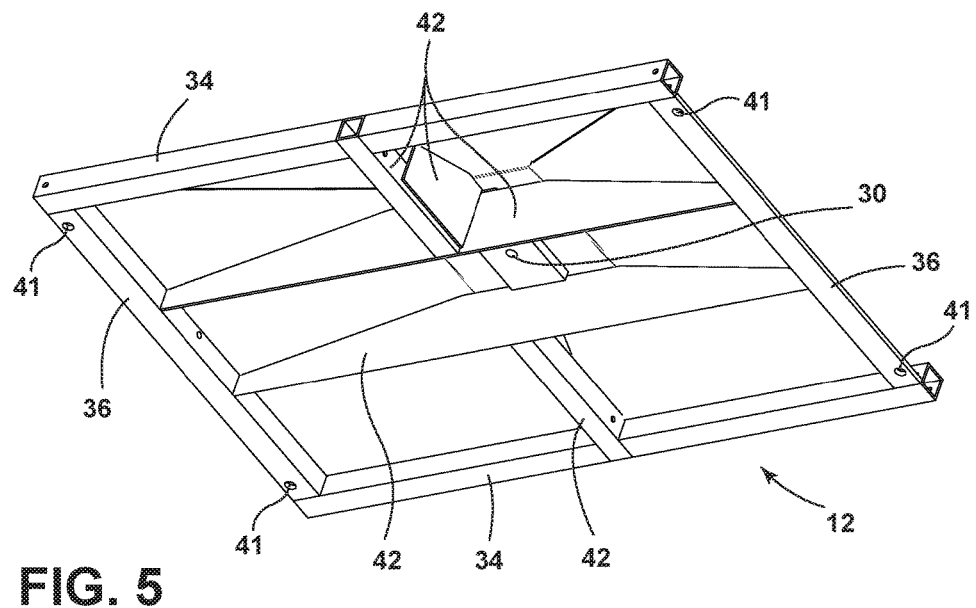
FIG. 5 is a lower perspective view of the base.

As shown in FIG. 5, an underside of the base 12 is reinforced with a plurality of reinforcing structural members in the form of reinforcement ribs 42. The reinforcement ribs 42 may be welded to or formed with the base 12 and provide structural support to the base 12. It should be understood that more or fewer reinforcement ribs are contemplated and the illustrated arrangement is merely exemplary.

Figure 6:
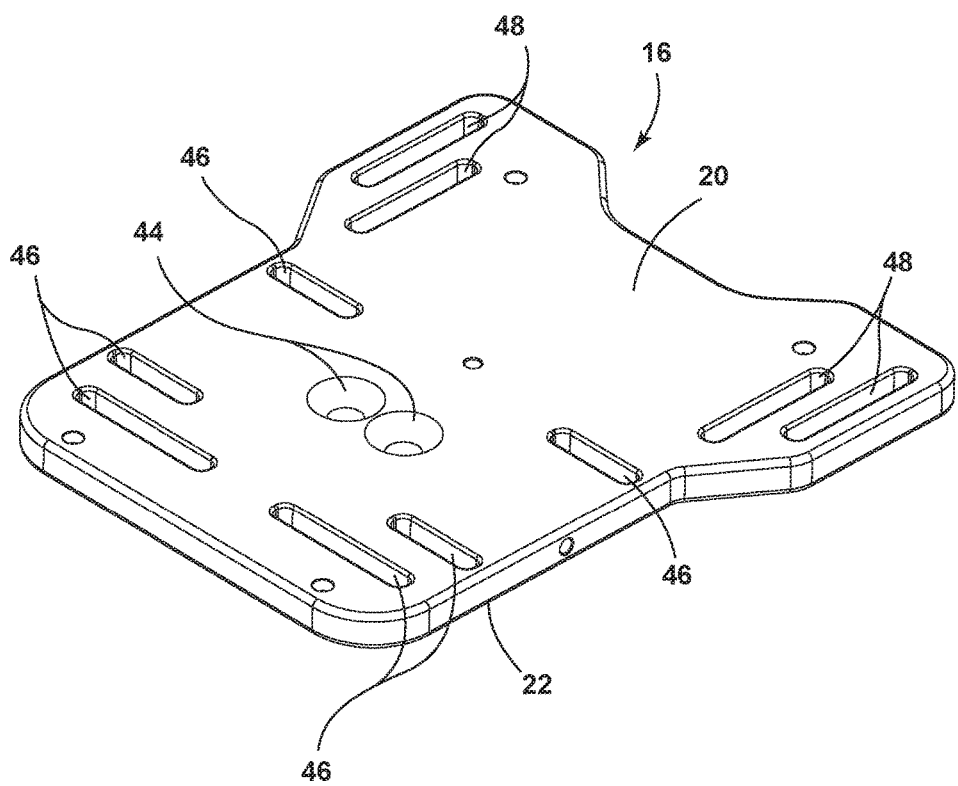
FIG. 6 is an upper perspective view of a mounting plate of the exercise training device.

Referring to FIG. 6, the mounting plate 16 is a planar member that includes a plurality of mounting features. Disposed near a center of the mounting plate 16 are two mounting plate mounting holes 44. The mounting plate 16 also includes a plurality of paired transverse slots 46 and paired longitudinal slots 48 arranged in a desired configuration. The slots 46 and 48 extend through the thickness of the mounting plate 16 for affixing a plurality of hold downs therethrough, as described below. The illustrated configuration of slots 46, 48 is exemplary and not meant to be limiting; other configurations are contemplated for mounting different motorcycles with varying structures to the mounting plate 16.

As seen in FIG. 3, the training device 10 includes a plurality of substantially J-shaped hold downs—a pair of front hold downs 50 and a pair of foot peg hold downs 52. The hold downs 50, 52 include a releasable hook portion 54 and a threaded portion 56 to which a threaded bolt or knob 58 may be attached. The hold downs 50, 52 and knobs 58 are configured to releasably affix a motorcycle 18 to the mounting plate 16. Each hold down 50, 52 is placed through one of the slots 46, 48 in the mounting plate 16, and the position of the hold down 50, 52 within the slot 46, 48 may be adjusted along the length of the slot 46, 48 to accommodate the varying structures of different motorcycles 18. The front hold downs 50 can be positioned through any of the transverse slots 46, and the hook portion 54 can be hooked over an appropriate structure of the motorcycle 18, for example a portion of the motorcycle's frame. The knob 58 is threaded onto the threaded portion 56 of the hold down 50 and tightened to secure the motorcycle 18 to the mounting plate 16. In a similar fashion, the foot peg hold downs 52 can be positioned through any of the longitudinal slots 48, and the hook portion 54 can be hooked over an appropriate structure of the motorcycle 18, for example the motorcycle's foot peg. The configuration of the hold downs 50, 52 and slots 46, 48 is intended to be customizable to fit the different motorcycles available. Of course, it should be understood that more hold downs and slots may be utilized if needed.

The training device 10 also includes opposing restrictors, illustrated in the figures in the form of a pair of limit straps 60. The limit strap 60 is attached to both the base 12 and the mounting plate 16. More specifically, the limit straps 60 are attached to the base 12 on each of the transverse sides 34 thereof and to the mounting plate 16 on the transverse sides of the mounting plate 16. The limit straps 60 have a length such that the left limit strap 60 restricts the degree of incline to which the motorcycle 18 can be maneuvered to the right, and the right limit strap 60 restricts the degree of incline to which the motorcycle 18 can be maneuvered to the left. In one example, the opposing limit straps 60 prevent movement in a lateral direction relative to the frame of the motorcycle 18 beyond approximately 45° from vertical. This configuration can help prevent a rider from tipping the mounted motorcycle 18 all the way over. Further, while the restrictors are referred to herein as limit straps, it should be understood that restrictors may be in the form of ropes, springs, cables, or any other suitable restrictor.

As described above, the ends of the coil spring 24 are mounted to the mounting plate 16 and the base 12 with spring plates 62. Referring to FIG. 3, the spring plate 62 is a rigid member that includes two central mounting holes 64 extending through the thickness of the spring plate 62. The spring plate 62 includes a spring channel 66 positioned at each of the distal ends of the spring plate 62. The spring channels 66 are formed substantially oppositely—one channel 66 opens upward, and the other channel 66 opens downward. Further, the spring channels 66 are curved and sized appropriately to receive the ends of the coil spring 24 therein. The coil spring 24 may be a closed and ground compression type spring.

The first spring plate 62 is affixed to the base 12 with fasteners (not shown) that extend through the aligned mounting holes 30 and 64. The upward-facing spring channel 66 receives a portion of the lower end 28 of the coil spring 24, and the downward-facing spring channel 66 receives a radially opposite portion of the coil spring 24. The downward-facing spring channel 66 sandwiches a portion of the coil spring 24 between the spring plate 62 and the central surface 14 of the base 12. In this configuration, the lower end 28 of the coil spring is mounted to the base 12.

The second spring plate 62 is affixed to the lower surface 22 of the mounting plate 16 with fasteners (not shown) that extend through the aligned mounting holes 44 and 64. The downward-facing spring channel 66 receives a portion of the upper end 26 of the coil spring 24, and the upward-facing spring channel 66 receives a radially opposite portion of the coil spring 24. The upward-facing spring channel 66 sandwiches a portion of the coil spring 24 between the spring plate 24 and the lower surface 22 of the mounting plate 16. In this configuration, the upper end 26 of the coil spring is mounted to the mounting plate 16.

As described above, the transverse support legs 38 and longitudinal support legs 40 extend out from the base 12, providing stability in the side-to-side and fore-aft directions. Further, each of the support legs 38 and 40 includes a hole 68 at a distal end thereof for affixing the training device 10 to the floor surface. The through-holes 41 in the frame 32 may also be used for affixing the base 12 to the floor surface. For example, although not shown, the floor or other support surface can include a plurality of sunken anchors. Bolts extend through each of the holes 68 in the support legs 38 and 40 and the through-holes 41 in the frame 32 and are received in the corresponding sunken anchors. It should be understood that threaded bolts and anchors, or any other suitable fastening means can be utilized to affix the training device 10 to the support surface.

Each of the support legs 38 and 40 may optionally include a height adjustable foot 70 at the distal end thereof. The height adjustable feet 70 enable the training device 10 to be leveled when placed on a somewhat uneven support surface. The height adjustable feet 70 may be included either instead of or in addition to the floor mounting fasteners.

Figure 8:
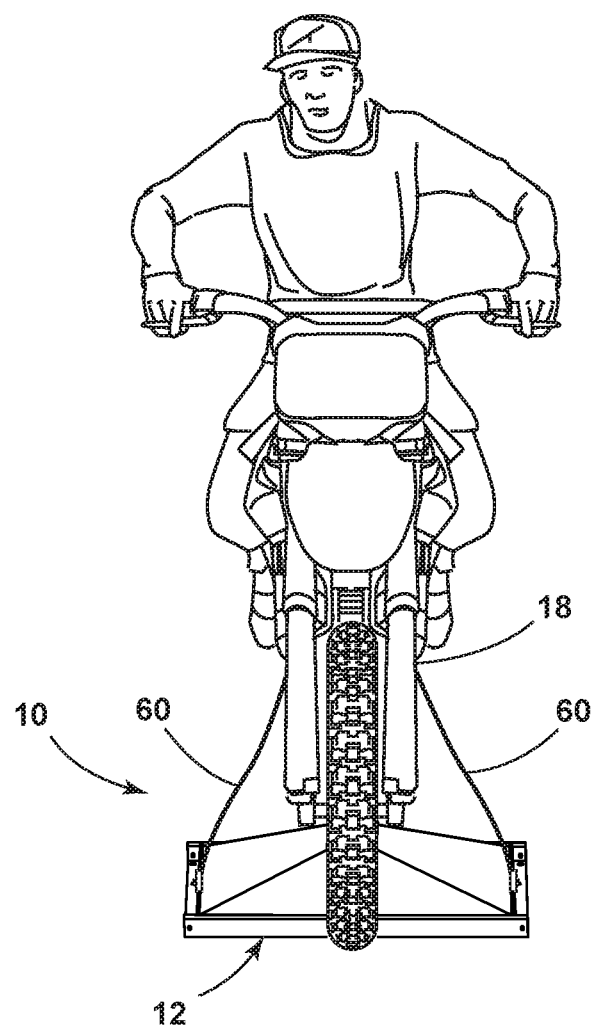
FIG. 8 illustrates a rider seated on a motorcycle mounted to the exercise training device, and illustrating an alternative base for mounting to a floor surface.
Figure 9:
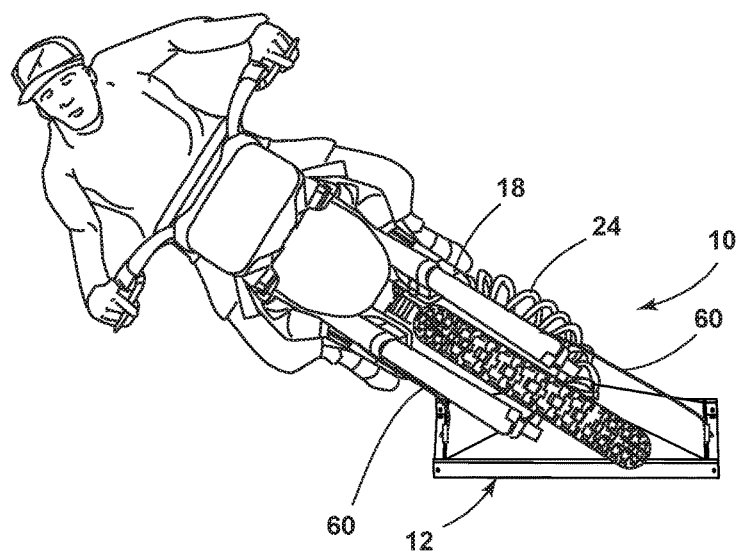
FIG. 9 illustrates a rider using the exercise training device of FIG. 8 by maneuvering the motorcycle to one side.
Figure 10:
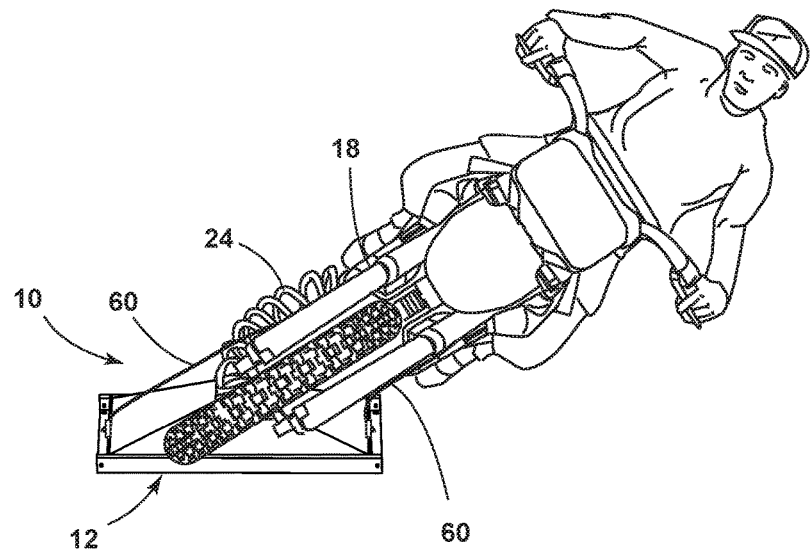
FIG. 10 illustrates a rider using the exercise training device of FIG. 8 by maneuvering the motorcycle to the other side.

Alternatively, as shown in FIGS. 8-10, the training device 10 may be provided without the support legs 38 and 40, and may be affixed to the floor surface. As described above, the through-holes 41 in the base frame 32 may be used for affixing the base 12 to the floor surface, using threaded bolts and anchors, or any other suitable fastening means. Further, although the base 12 is shown including four through holes 41 in the frame 32, more or fewer through holes may be utilized and at locations other than what is illustrated.

As described above, the coil spring 24 of the training device 10 is mounted between the base 12 and the mounting plate 16, and a motorcycle 18 may be mounted to the mounting plate 16. The coil spring 24 is compressible in the vertical direction and provides 360° of movement in a direction offset from the vertical direction and coincident with the longitudinal axis of the coil spring 24. The coil spring 24 retains the frame of the motorcycle 18 in an upright position and allows deflection in response to lateral forces such that the affixed motorcycle 18 can pitch and roll when subject to sufficient force to overcome the bias of the coil spring 24. It should be understood that lateral forces and movement as used herein refer to forces applied perpendicular to a longitudinal axis of the coil spring 24, resulting in movement of the coil spring 24 in a generally inverted conical-shaped space. Further, the spring force or spring constant of the coil spring 24 is selected to provide an appropriate amount of force to support the weight of a rider and the motorcycle, as well as to provide an appropriate amount of force such that the rider may overcome the coil spring 24 to move the motorcycle in a direction offset from vertical. The freedom of movement of the motorcycle 18, as provided by the training device 10, is intended to be representative of, and mimic the movement of, a motorcycle ridden during motocross racing or similar type riding.

In Use

Figure 7:
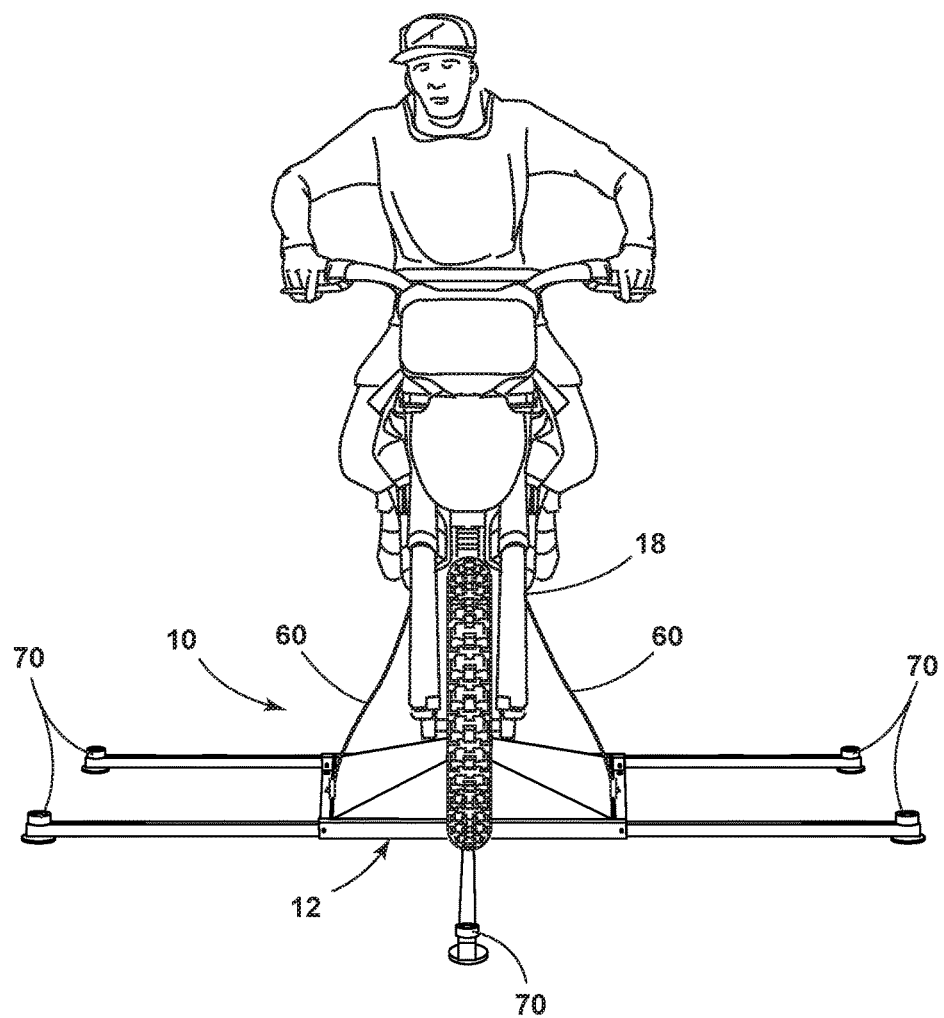
FIG. 7 illustrates a rider seated on a motorcycle mounted to the exercise training device.

The training device 10 enables a rider to perform strengthening and balance exercises while seated on a motorcycle 18 that is mounted to the training device 10. The seated rider can controllably maneuver the motorcycle 18 between an initial vertical position, shown in FIG. 7, and a laterally inclined position where the motorcycle 18 is inclined to the right, shown in FIG. 8, or inclined to the left, shown in FIG. 9. The rider, using primarily his or her abdominal muscles, maneuvers the position of the motorcycle 18 by leaning to one side or the other. If the rider would like to add resistance to make the exercise more difficult, the rider can hold a weight in one or both hands.

Using the exercise training device 10 to perform strengthening and balance exercises while seated on a motorcycle is effective and more targeted for training riders than commonly known abdominal exercises. Further, the training device 10 is representative of and mimics the movement of a motorcycle ridden in motocross racing.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Features of various embodiments may be used in combination with features from other embodiments. Directional terms, such as "vertical," "horizontal," "top," "bottom," "front," "rear," "upper," "lower," "inner," "inwardly," "outer," "outwardly," "forward," and "rearward" are used to assist in describing the invention based on the orientation of the embodiments shown in the illustrations. The use of directional terms should not be interpreted to limit the invention to any specific orientation(s). Any reference to claim elements in the singular, for example, using the articles "a," "an," "the" or "said," is not to be construed as limiting the element to the singular.

What is claimed is:

1. An exercise training device for use with a motorcycle, the training device comprising:
   a base having a central surface;
   a mounting plate having an upper surface and a lower surface;
   a coil spring having a longitudinal axis and vertically mounted between said base and said mounting plate, an upper end of said coil spring attached to said lower surface of said mounting plate, a lower end of said coil spring attached to said central surface of said base;
   a plurality of hold downs configured to releasably affix a motorcycle to said mounting plate; and
   a pair of restrictors attached to said base and said mounting plate,
   wherein said coil spring deflects in response to forces applied laterally to the longitudinal axis of said coil spring such that said affixed motorcycle can pitch and roll when subject to sufficient force.

2. The exercise training device of claim 1 wherein a rider seated on said motorcycle can controllably maneuver said motorcycle between an initial vertical position and an inclined position where said motorcycle is inclined to the left or right of said vertical position.

3. The exercise training device of claim 2 wherein said rider maneuvers the position of said motorcycle by leaning to one side or the other.

4. The exercise training device of claim 2 wherein a left restrictor restricts the degree of incline to which said motorcycle can be maneuvered to the right, and a right restrictor restricts the degree of incline to which said motorcycle can be maneuvered to the left.

5. The exercise training device of claim 1 wherein said base includes elongated legs that extend out from said base.

6. The exercise training device of claim 5 wherein said legs each include a hole at a distal end thereof for affixing said training device to a floor surface.

7. The exercise training device of claim 5 wherein said legs each include a height adjustable foot at a distal end thereof.

8. The exercise training device of claim 1 wherein an underside of said base includes reinforcing structural members.

9. The exercise training device of claim 1 wherein said mounting plate includes a plurality of slots therethrough.

10. The exercise training device of claim 9 wherein said hold downs extend through said slots in said mounting plate and the position of said hold down within said slot may be adjusted to accommodate the structures of different motorcycles.

11. The exercise training device of claim 1 wherein said base includes a plurality of through holes configured for fasteners to extend therethrough for affixing said exercise training device to a floor surface.

12. The exercise training device of claim 1 wherein said coil spring defines upper and lower ends, the upper end can pivot substantially 360° about said lower end of said coil spring affixed to said base.

13. The exercise training device of claim 12 wherein said restrictors restrict how far said motorcycle mounted to said mounting plate can pivot.

14. An exercise training device for developing skills useful for motocross racing; comprising:
   a base;
   a biasing element extending upwardly from said base to a mount, with said mount being spaced from said base by said biasing member, and said mount being configured to secure a frame of a motorcycle to said biasing element;
   said biasing element being compressible in a vertical direction and providing three hundred sixty degrees of movement in a direction offset from the vertical direction being representative of movement of a motorcycle while motocross racing; and
   opposing restrictors for restricting movement in a lateral direction relative to said frame of the motorcycle.

15. The training device of claim 14, wherein said biasing member comprises a coil spring.

16. The training device of claim 14, wherein said opposing restrictors comprise opposing straps extending between said mount and said base thereby.

17. The training device of claim 14, wherein said mount includes a plurality of hold downs each defining a releasable hook for releasably securing the frame of the motorcycle to said mount.

18. The training device of claim 14, wherein said biasing member retains the frame of the motorcycle in an upright position and allows pitch and roll of the frame of the motorcycle when subject to force sufficient to overcome the bias of said biasing member.

19. The training device of claim 14, wherein said opposing restrictors prevent movement in a lateral direction relative to said frame of the motorcycle beyond about forty five degrees from the vertical orientation.

\* \* \* \* \*